United States Patent [19]

Boykin

[11] Patent Number: 4,566,307
[45] Date of Patent: Jan. 28, 1986

[54] PIPELINE FLOW MEASUREMENT PROVING SYSTEM

[75] Inventor: John C. Boykin, Dallas, Tex.

[73] Assignee: Electronic Flo-Meters, Inc., Garland, Tex.

[21] Appl. No.: 666,122

[22] Filed: Oct. 29, 1984

Related U.S. Application Data

[62] Division of Ser. No. 429,610, Sep. 30, 1982, abandoned.

[51] Int. Cl.⁴ .............................................. G01F 25/00
[52] U.S. Cl. ............................................................. 73/3
[58] Field of Search ..................................... 73/3, 196

[56] References Cited

U.S. PATENT DOCUMENTS

| | | | |
|---|---|---|---|
| 2,958,218 | 11/1960 | Hill | 73/3 |
| 3,138,013 | 6/1964 | Smith | 73/3 |
| 3,187,551 | 6/1965 | Hill | 73/3 |
| 3,711,689 | 1/1973 | Park | 73/196 |
| 4,114,440 | 9/1978 | Stapler | 73/861.92 |
| 4,152,936 | 5/1979 | Boykin | 73/198 |

FOREIGN PATENT DOCUMENTS 15667 of 1913 United Kingdom ............. 73/861.83

*Primary Examiner*—S. Clement Swisher
*Attorney, Agent, or Firm*—Richards, Harris, Medlock & Andrews

[57] ABSTRACT

A pipeline flow measurement proving system has a custody transfer insertion turbine meter mounted at a first location on a fluid pipeline. A proving insertion turbine flow meter is mounted at a second location on the pipeline upstream from the custody meter at a distance of approximately ten diameters of the pipeline. This offset spacing reduces the fluid turbulence which may be produced by the turbine head of the proving meter. The proving meter is calibrated against a standard at the National Bureau of Standards. Each of the flow meters produces a pulse signal which is proportional to the rotation of the corresponding turbine head. The calibration is carried out by counting the number of pulses produced by the two meters during a selected time period. The ratio of the counts of the pulses comprises a calibration constant which is utilized by a custody transfer flow computer for producing a flow measurement. The proving insertion turbine flow meter can be utilized to calibrate a plurality of custrody meters or can be utilized as a backup for the custody meter.

6 Claims, 2 Drawing Figures

PIPELINE FLOW MEASUREMENT PROVING SYSTEM

This is a division of appliation Ser. No. 429,610, filed 9-30-82 now abandoned.

TECHNICAL FIELD

The present invention pertains in general to the measurement of fluid flow through pipelines and more particularly to the calibration of instruments which measure the fluid flow.

BACKGROUND OF THE INVENTION

There are numerous requirements for the accurate measurement of fluid flow through pipelines. This is particularly true in the measurement of natural gas and liquid petroleum products where the value of the products passing through the pipeline is very great. Particular applications for fluid measurement in pipelines include:
1. Throughput measurement for custody transfer.
2. Peak loading control systems.
3. Blending systems.
4. Pacing of gas samplers.
5. Pacing of gas odorizers.
6. Compressor surge control.

Fluid flow in pipelines is most typically measured by the use of orifice plates. However, there is an increasing use of turbines for pipeline flow measurement. This includes both full flow turbines and insertion turbine meters.

Any type of flow measurement system for pipelines requires periodic calibration to insure that the fluid measurement is accurate. The equipment required for an orifice metering system and its calibration typically include a complete bypass pipeline segment and additional hardware including upstream and downstream block valves, a pass line, orifice flanges, upstream and downstream flanges, as well as additional orifice plates, transducers and various parameter recorders. The calibration system typically requires at least a temporary shut-down of the pipeline. The calibration equipment and related hardware also constitute a substantial capital expense.

One method which has been proposed for the calibration of fluid flow through pipelines is the use of multiple flow lines in a main pipeline with each flow line having a line meter. One flow line is provided with a calibrated master meter. A piping and valve arrangement is provided in which the flow through any one of the line meters can be directed through the master meter such that each of the line meters can be calibrated. Such a system, however, utilizes an expensive combination of multiple lines, multiple line filters, valves and valve operators which in turn require extensive operator control and maintenance.

In view of the importance of calibrating fluid flow in pipelines and the expense heretofore incurred for such calibration, there exists the need for a method and apparatus for rapidly, accurately and inexpensively proving the metering of fluid through pipelines without the necessity for shutting down the pipeline or building an extensive network of pipeline bypasses and related equipment.

SUMMARY OF THE INVENTION

A selected embodiment of the present invention comprises a metering proving system for use in a fluid carrying main pipeline which includes a custody transfer meter mounted in the main pipeline at a first location. The invention further includes an insertion turbine flow meter including a turbine head certified by means traceable to a standard at the National Bureau of Standards and mounted for selective insertion into the main pipeline at a distance spaced from the custody meter of at least about 10 times the diameter of the main pipeline.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
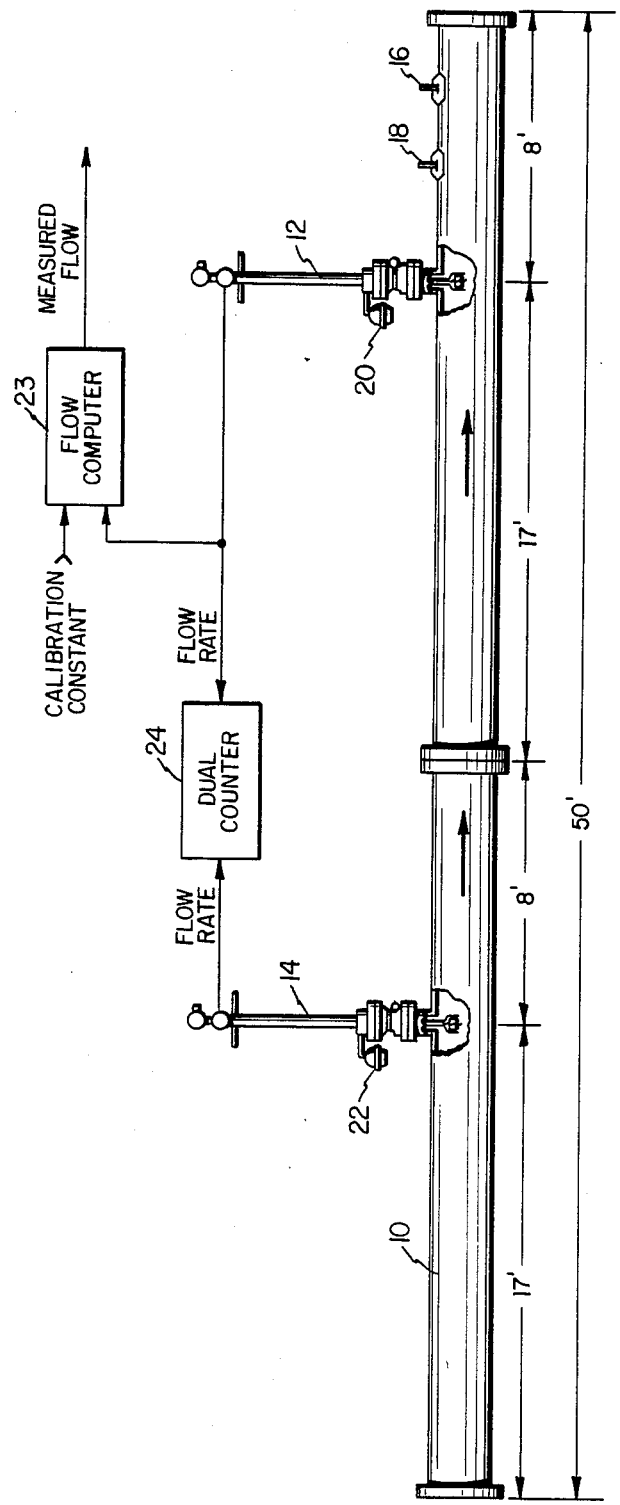
FIG. 1 is an elevation view of a main pipeline which transports a fluid that is measured by means of a custody transfer insertion turbine meter that is calibrated by a certified insertion turbine flow meter mounted upstream on the main pipeline.

Referring now to FIG. 1 there is illustrated a metering proving system which is installed in a gas pipeline. The metering proving system can also be used in a liquid pipeline. A pipeline 10 has, for example, a diameter of 24 inches. A custody transfer insertion turbine meter 12 is mounted at a first location on the pipeline 10. A proving insertion turbine flow meter 14 is mounted on the pipeline 10 upstream from the meter 12. Note that the proving meter is mounted approximately 25 feet upstream from the custody transfer meter. This is at least ten times the diameter of the pipeline 10. This reduces fluid turbulence between the meters.

The insertion turbine meters 12 and 14 are described in detail in U.S. Pat. No. 4,152,936 to Boykin, et al. issued May 8, 1979. U.S. Pat. No. 4,152,936 is herein incorporated by reference.

The pipeline 10 is further fitted with a temperature sensor 16 and a specific gravity sensor 18. The meter 12 includes a pressure transmitter 20 and the turbine meter 14 includes a pressure transmitter 22.

Each of the turbines in the meters 12 and 14 produces a pulse signal proportional to the flow rate through the pipeline. These pulse, flow rate signals from meters 12 and 14 are input to a dual counter 24, which counts the pulses for each signal. The flow rate signal from the custody meter 12 is provided to a flow computer 23 which receives a calibration constant and produces a measure of the flow through the pipeline. The flow computer 23 is, for example, a Model TR-30/PT, manufactured by Electronic Flo-Meters, Inc., Dallas, Tex.

Figure 2:
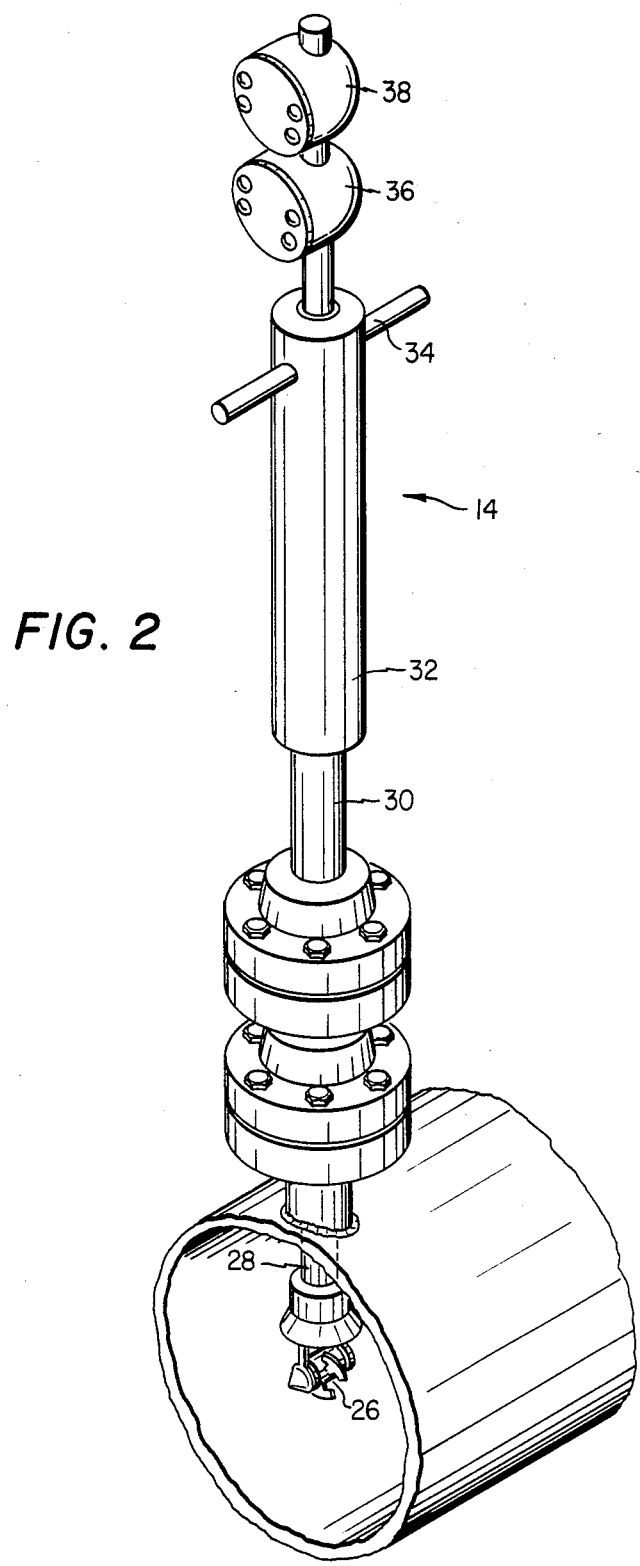
FIG. 2 is a detailed illustration of an insertion turbine flow meter as utilized in the measurement of fluid flow shown in FIG. 1.

An insertion turbine flow meter as utilized with the present invention is illustrated in greater detail in FIG. 2. The turbine meter 14 is illustrated and it is essentially the same as the turbine meter 12. The turbine meter 14 includes a turbine head 26 which is caused to rotate at a rate proportional to the flow of fluid through the pipeline 10. The turbine head 26 is supported on a stem 28 which is retractable through a cylinder 30. A cylindrical guide 32 is fitted to slide over the cylinder 30 and provide alignment of the stem 28 within the cylinder 30. A bar 34 is connected to the guide 32 for manual movement of the turbine head 26. The stem 28 is connected to the guide 32 such that the turbine head 26 can be inserted into the pipeline 10 or retracted from the flow. The turbine meter 14 is further provided with electrical junction boxes 36 and 38 through which electrical cables are connected to transfer the sensor information including flow rate, pressure and temperature. The specific operation and details of construction of the flow meter 14 are included in the referenced patent to Boykin, et al.

The operation of the proving system of the present invention is now described in reference to FIGS. 1 and 2. The custody transfer turbine meter 12 is permanently installed on the main pipeline 10 to provide continuous measurement of the fluid passing through the pipeline. The spinning of the turbine for the meter 12 produces a pulse signal which is proportional to the fluid flow through the pipeline 10. This pulse signal is input to the flow computer 23 which counts the pulses and by use of a calibration constant produces a measurement of the fluid flow through the pipeline 10. In order to maintain an accurate measurement of the flow through the pipeline 10, there must be a periodic proving of the meter 12. This is carried out by use of the proving meter 14. The meter 14 may be calibrated in an independent laboratory such that its accuracy is traceable to a standard at the National Bureau of Standards. One such independent laboratory that carries out this calibration is Colorado Experimental Engineering Station, Inc. located at Nunn, Colorado.

The proving insertion turbine meter 14 can be mounted permanently on the pipeline 10 or can be moved from one location to another to prove a plurality of custody flow meters. After the proving flow meter 14 is mounted on the pipeline 10 the meters 12 and 14 are operated concurrently for a selected period of the time. Each of the meters produces a pulse signal which is proportional to the rotation of the corresponding turbine heads. These pulse signals are input to the dual counter 24. The number of pulses produced over the selected time period is counted. For example, the meters are run for a sufficient time to count 10,000 pulses such that there can be a 0.01% comparison of the pulse rates. A ratio is taken for the number of counts and this ratio is utilized as the calibration constant for input to the flow computer 23. Thus, the custody transfer meter 12 is proved to approximately the accuracy of the proving turbine meter 14 which, as noted above, is calibrated against a precise standard traceable to the National Bureau of Standards.

Although an insertion turbine flow meter is illustrated for the custody meter described herein, other types of custody meters such as orifice plate meters can be proven by using the technique described above.

Although one embodiment of the present invention has been illustrated in the accompanying Drawings and described in the foregoing Detailed Description, it will be understood that the invention is not limited to the embodiment disclosed but capable of numerous rearrangements, modifications and substitutions without departing from the scope of the invention.

I claim:

1. A metering proving system for use in a fluid carrying main pipeline which comprises:
   a custody transfer meter mounted in said main pipeline at a first location, said custody transfer meter generating electrical pulses in response to the flow of the fluid through said pipeline;
   a proving insertion turbine flow meter including a turbine head certified by means traceable to a standard at the National Bureau of Standards, said proving insertion turbine flow meter removably mounted for selective insertion into said main pipeline without the stopping or rerouting of the flow of fluid through said main pipeline, said proving insertion turbine flow meter located at a distance spaced from said custody transfer meter of at least ten times the diameter of said main pipeline, said insertion turbine flow meter generating electrical pulses in response to the flow of the fluid through said main pipeline, and
   means for separately counting the pulses generated by said custody transfer meter and said turbine flow meter during a given time period due to said fluid passing through said main pipeline for producing respective first and second counts wherein the ratio of said counts comprises a calibration constant for said custody transfer meter.

2. A metering proving system as recited in claim 1 wherein said insertion turbine flow meter having said certified turbine head is mounted on said main pipeline upstream form said custody transfer meter.

3. A metering proving system as recited in claim 1 wherein said custody transfer meter is an insertion turbine flow meter.

4. A method for proving the metering of a fluid passing through a main pipeline, comprising the steps of:
   providing a continuous flow of said fluid through said main pipeline;
   custody transfer metering the flow of said fluid through said main pipeline by use of a custody flow meter mounted on said pipeline, said custody transfer metering providing a custody transfer fluid measurement for a selected time period;
   inserting a proving turbine flow meter turbine head into said fluid passing through said pipeline without stopping or rerouting the flow of said fluid through said pipeline;
   calibration metering the flow of said fluid through said main pipeline by use of said insertion turbine flow meter having said turbine head certified by means traceable to a standard at the National Bureau of Standards and mounted on said main pipeline at a distance of at least ten times the diameter of said main pipeline from said custody flow meter, said calibration metering producing a calibrated fluid measurement for said selected time period; and
   comparing said custody transfer fluid measurement and siad calibrated fluid measurement to produce a calibration constant for calibrating said custody transfer metering.

5. A method for proving the metering of a fluid passing through a main pipeline as recited in claim 4 wherein the step of calibration metering is carried out at a point upstream in said flow from said custody transfer metering.

6. A method for providing the metering of a fluid passing through a main pipeline as recited in claim 4 wherein the step of custody transfer metering comprises measuring the flow of said fluid through said pipeline by means of an insertion turbine flow meter.

* * * * *

UNITED STATES PATENT AND TRADEMARK OFFICE
CERTIFICATE OF CORRECTION

PATENT NO. : 4,566,307
DATED : Jan. 28, 1986
INVENTOR(S) : Boykin

It is certified that error appears in the above-identified patent and that said Letters Patent is hereby corrected as shown below:

ABSTRACT, line 19, "custrody should be --custody--.

Column 4, line 26, "form" should be --from--.

Signed and Sealed this

Thirtieth Day of September 1986

[SEAL]

Attest:

DONALD J. QUIGG

Attesting Officer    Commissioner of Patents and Trademarks